(12) United States Patent
Lin (10) Patent No.: US 6,301,061 B1
(45) Date of Patent: Oct. 9, 2001

(54) SWITCHING DEVICE FOR MULTIPLE (DUAL) FOCUS POINTS OF MULTIPLE (DUAL) OPTICAL PATHS

(76) Inventor: Bob Lin, No. 9, Lane 102, San-Min Rd., Taipei (TW)

(*) Notice: Subject to any disclaimer, the term of this patent is extended or adjusted under 35 U.S.C. 154(b) by 0 days.

(21) Appl. No.: 09/576,823

(22) Filed: May 23, 2000

(51) Int. Cl.[7] ............... G02B 17/00; G02B 3/10

(52) U.S. Cl. ........................... 359/726; 359/721

(58) Field of Search ................. 359/618, 627, 359/721, 726, 128, 139, 672–675; 385/16

(56) References Cited

U.S. PATENT DOCUMENTS

| 4,575,398 | * | 3/1986 | Tschishow | 156/99 |
| 6,233,063 | * | 5/2001 | Bernasconi et al. | 358/474 |

FOREIGN PATENT DOCUMENTS 0 521 311-A1 * 1/1993 (EP).

* cited by examiner

Primary Examiner—Jordan M. Schwartz
(74) Attorney, Agent, or Firm—Bacon & Thomas, PLLC (57) ABSTRACT

A switching device for multiple (dual) focus points of multiple (dual) optical paths in a scanning optical path device is disclosed. The scanning optical path means comprising: a glass arranged for supporting a document, a reflector blow the glass, a primary lens with respect to the reflector, a sensing element behind the primary lens. At least two lenses of different thickness are arranged between the reflector and primary lens. In switching, various scanning optical paths or multiple (dual) optical paths switching operation are performable so that the focus points are higher than the surface of the glass. Thus, the original document (a film) has a proper gap with the surface of the glass on the platform for avoiding Newton ring (interference strips) effect so as to acquire a clear scanning effect. Another, the original document of an auto paper feeder can be focused correctly.

9 Claims, 9 Drawing Sheets

SWITCHING DEVICE FOR MULTIPLE (DUAL) FOCUS POINTS OF MULTIPLE (DUAL) OPTICAL PATHS

BACKGROUND OF THE INVENTION

The present invention relates to a switching device for multiple (dual) focus points of multiple (dual) optical paths, and especially to a switching device in which various scanning optical paths or dual optical paths can be performed.

Figure 1:
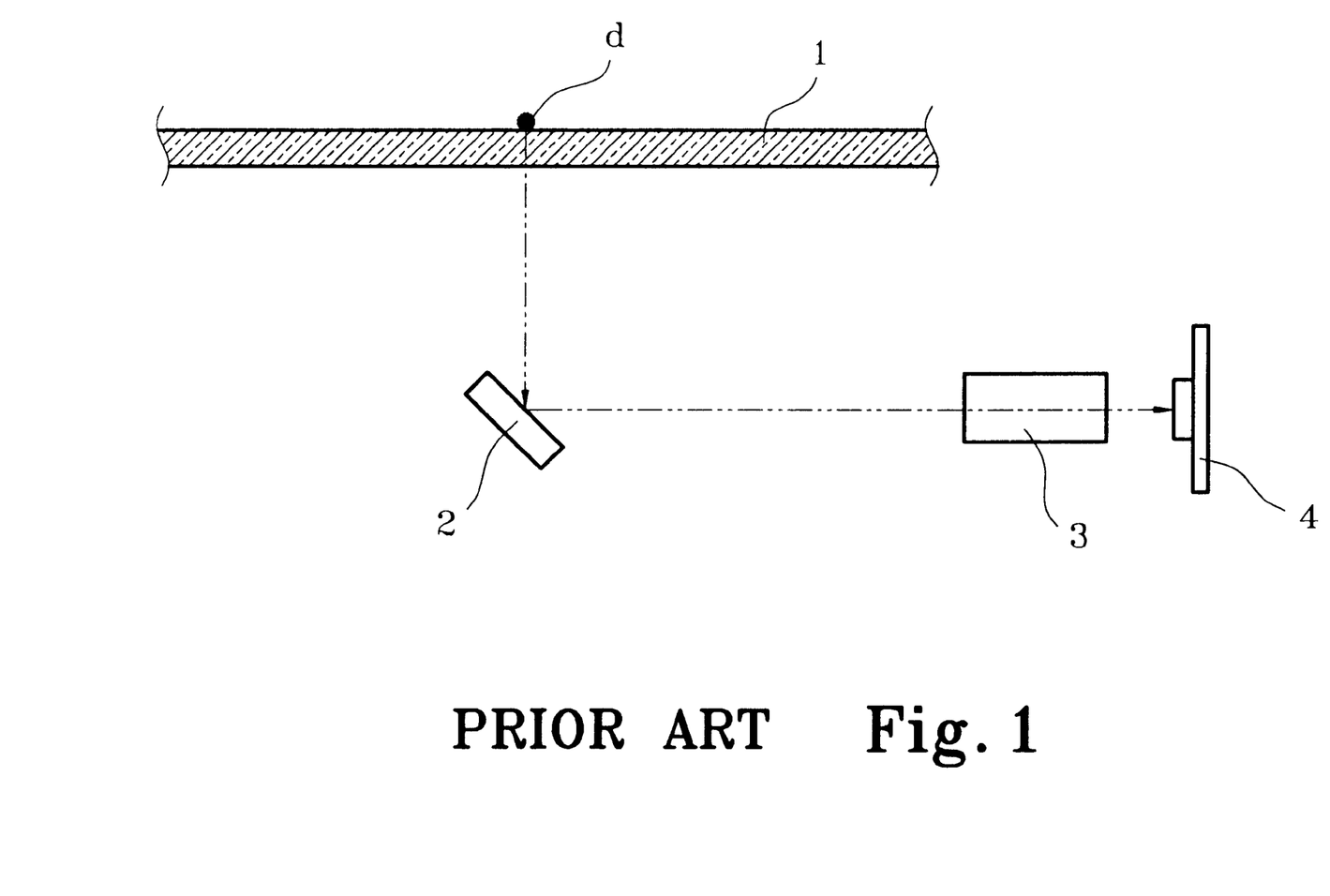
FIG. 1 is a schematic view showing a prior art scanning optical path.

As show in FIG. 1, the current scanning optical path device includes a glass 1 arranged in a scanner (not shown) and for supporting a document, a reflector 2 below the glass 1, a primary lens 3 with respect to the reflector 2 and arranged at one side in the scanner, a sensing element 4 behind the primary lens 3. After the document is radiated by light, the image of the scanning article is reflected by the reflector 2, then is projected to a lens 3, and then is received by the sensing element 4 so as to read the image of the document. In order to prevent that the transmitted original document, such as a positive piece or a negative piece, placed above the glass 1, a frame is added. By the width of the frame, the original document is placed higher than the surface of the glass with a distance so as to generate Newton rings (interference strips) in scanning so that the scanning effect is not preferred.

In the feeding process of an auto paper feeding, the original document is effected by a guide piece of the auto paper feeder so that the original document can not be correctly in the focus plane (that in the surface of the glass in the scanner). Therefore, Newton ring (interference strips) occurs so as to induce a bad image.

In order to solve the aforesaid problem, in another scanning optical path device (such as that shown in FIGS. 2A and 2B), a lenses with thickness t is arranged between a reflector 2 and a primary lens 3 (according to principle of optics, a lenses with reflectivity of 1.5, the optical path is increased to ⅓ of the thickness, namely, the original document is placed above the surface with a length of t/3). When the lenses t is switched to be between the reflector 2 and the primary lens 3, the second focus point d' has a height h being approximate equal to t/3. Thus, the original document is placed above the original focus point d.

Figure 2A:
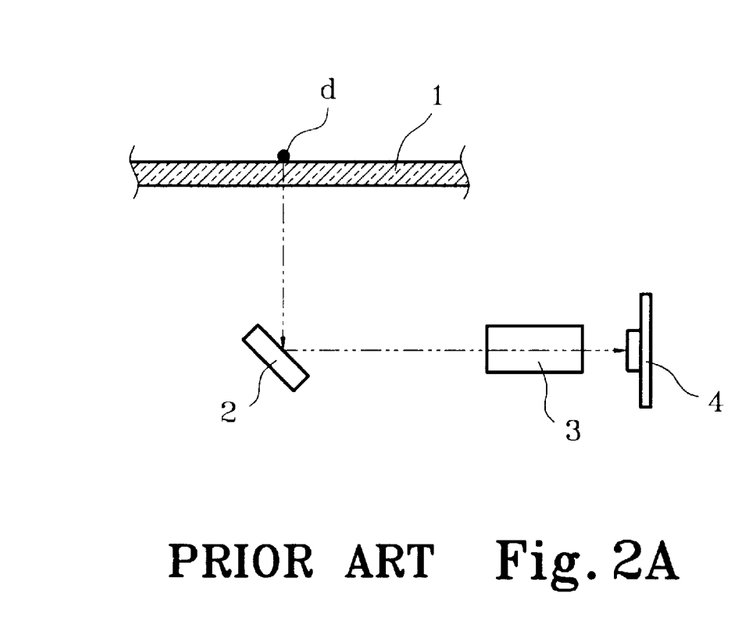
FIG. 2A is a schematic view of another prior art scanning optical path.
Figure 2B:
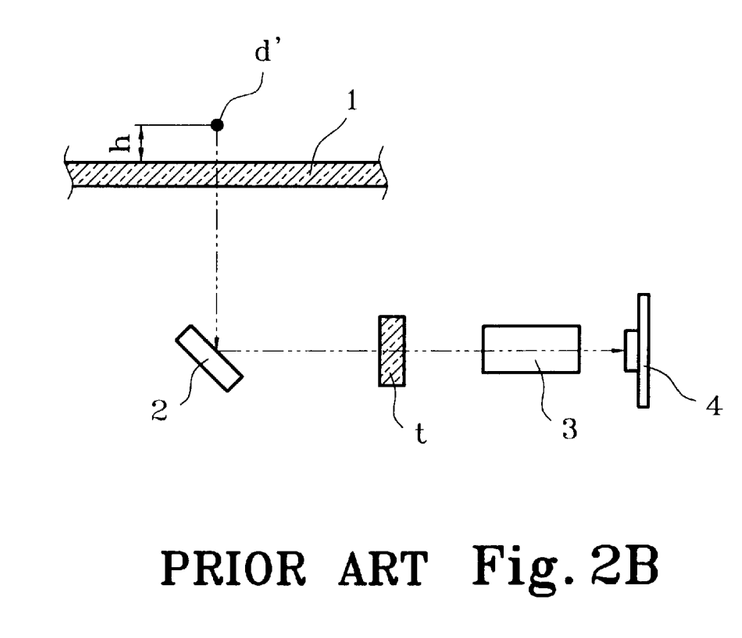
FIG. 2B is a schematic view of a switching scanning optical path in FIG. 2A.

However, this design has solved some prior art problems, but the optical path and focus points are fixed so not to be changed and thus, it can not be suitable in various conditions for acquiring a clear image. Therefore, there is an eager demand for a novel switching device for multiple (dual) focus points of multiple (dual) optical paths for improving the defects in the prior art designs.

SUMMARY OF THE INVENTION

The object of the present invention is to solve the switching with/without lenses. In the present invention, at least two lenses are arranged between the reflector and the primary lens. By the thickness switching of these lenses, the switching for multiple (dual) focus points or multiple (dual) optical paths are performed in order to avoid Newton rings (interference strips) effect due to the original document being placed above the original document so as not to be focused correctly.

Another object of the present invention is to provide a switching device for multiple (dual) focus points of multiple (dual) optical paths, in which the lenses can be displaced horizontally, or in cambered path, or in a circumference of a round so that the user may switch the lenses of different thickness.

A further object of the present invention is to provide a switching device for multiple (dual) focus points of multiple (dual) optical paths, wherein the lenses are arranged in a straight line, these lenses are transversal arranged or displaced, or is displaced upwards or downwards so that the switching for multiple (dual) focus points or multiple (dual) optical paths are performed A still object of the present invention is to provide a switching device for multiple (dual) focus points of multiple (dual) optical paths, wherein two (or many) lenses of different widths can be plated in the same way for acquiring an identical scanning effect.

The other object of the present invention is to provide a switching device for multiple (dual) focus points of multiple (dual) optical paths, wherein the present invention can be applied to an auto paper feeder so that the document on the auto paper feeder can be focused correctly for being scanned.

The various objects and advantages of the present invention will be more readily understood from the following detailed description when reading in conjunction with the appended drawing.

DETAILED DESCRIPTION OF THE PREFERRED EMBODIMENTS

Figure 3A:
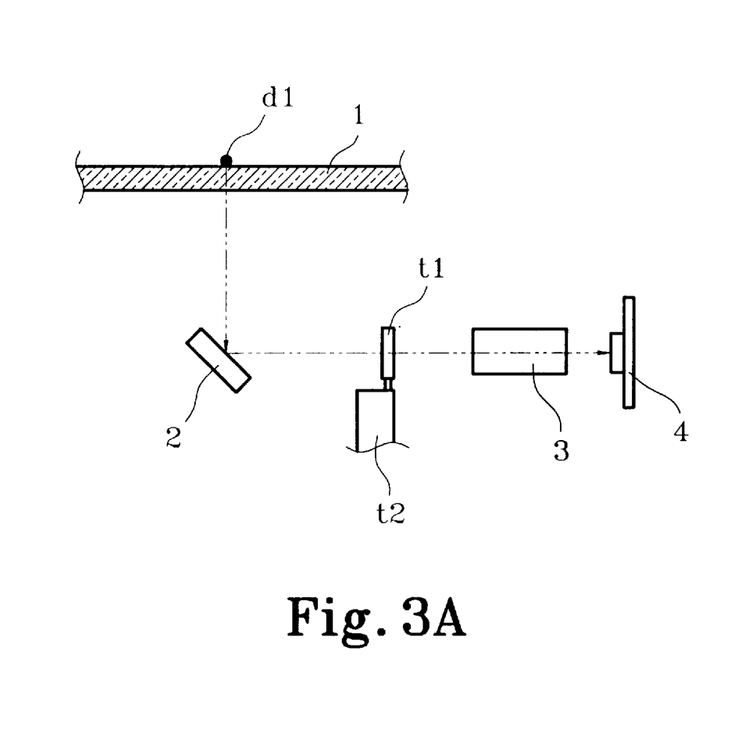
FIG. 3A is a schematic view of the first embodiment in the present invention.
Figure 3B:
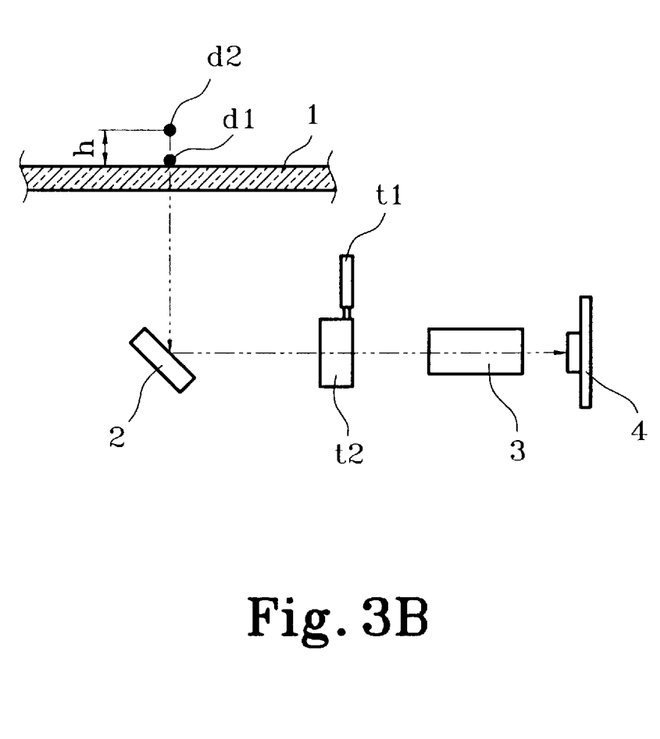
FIG. 3B is a schematic view showing the switching operation in FIG. 3A.

With reference to FIGS. 3A and 3B, the schematic views of the first embodiment and the switching action of the present invention are illustrated. As shown in the figures, in the switching device for multiple (dual) focus points of multiple (dual) optical paths according to the present invention, a scanning optical path device includes a glass 1 arranged in a scanner (not shown) and for supporting a document, a reflector 2 below the glass 1, a primary lens 3 with respect to the reflector 2 and arranged at one side in the scanner, a sensing element 4 behind the primary lens 3. After the document is radiated by light, the image of the scanning article is reflected by the reflector 2, then is projected to a lens 3, and then is received by the sensing element 4 so as to read the image of the document.

However, in this method, the transmitted document, such as positive or negative piece, is placed on the glass 1 for being positioned, in scanning, a Newton ring (interference strips) effect will occur so that the scanning image is vague. In order to solve this problem, in the present invention, at least two lenses t1 and t2 of different widths are arranged between the reflector 2 and primary lens 3. A thick/thin switching can be performed between these two lenses t1 and t2. If it is switched to the lens t1, then the focus point d1 (original document surface) is on the surface of the glass 1. If the focus point is switched to the lens t2, a second focus point d2=(t2−t1)/3 is acquired (original document surface), this second focus point d2 is above the first focus point d1 so that dual focus points are acquired. Meanwhile, in order to prevent that the transmitted original document, such as a positive piece or a negative piece, place above the glass 1, a frame is added. By the width of the frame, the original document is placed higher than the surface of the glass with a distance so as to avoid the Newton ring (interference strips) effect in scanning.

Figure 4A:
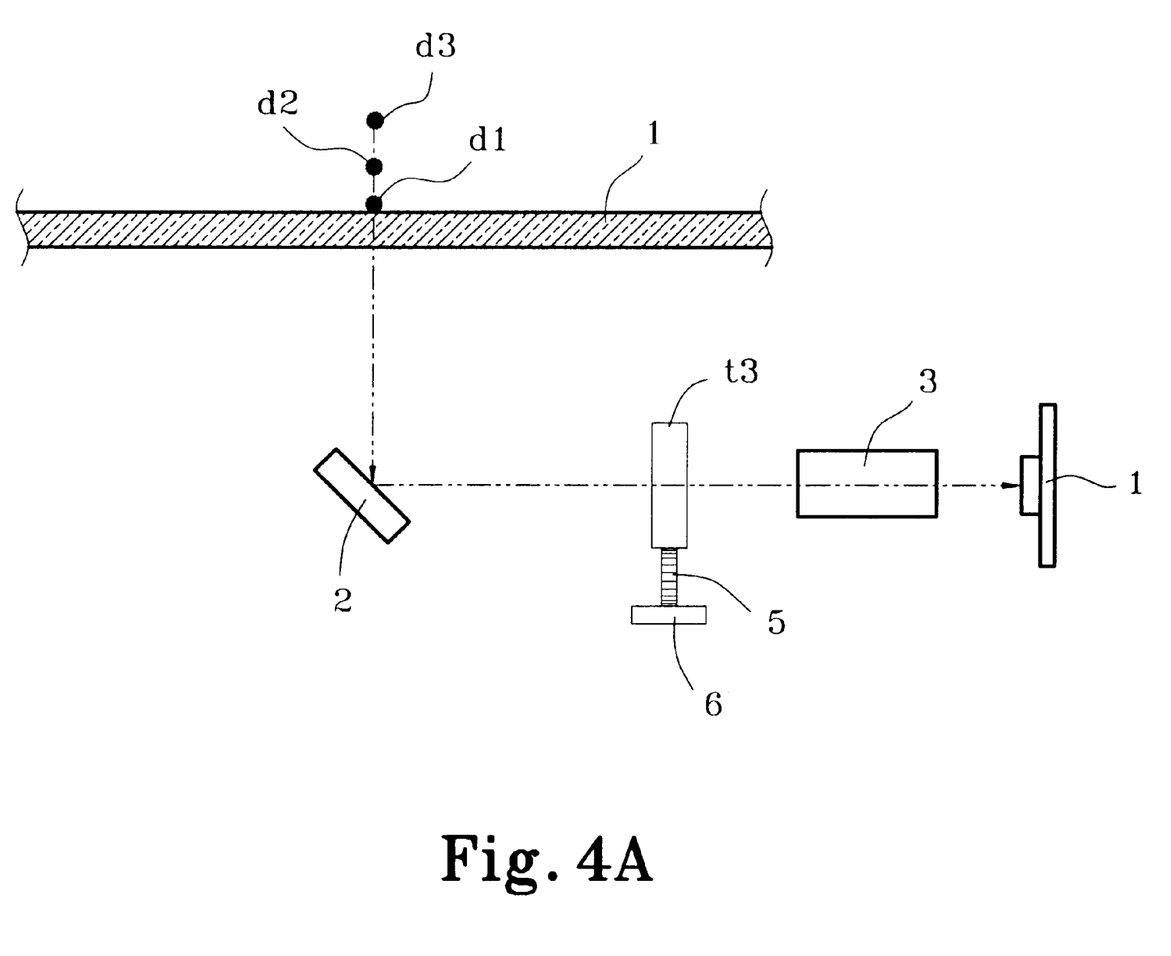
FIG. 4A is a schematic view showing the second embodiment in the present invention.
Figure 4B:
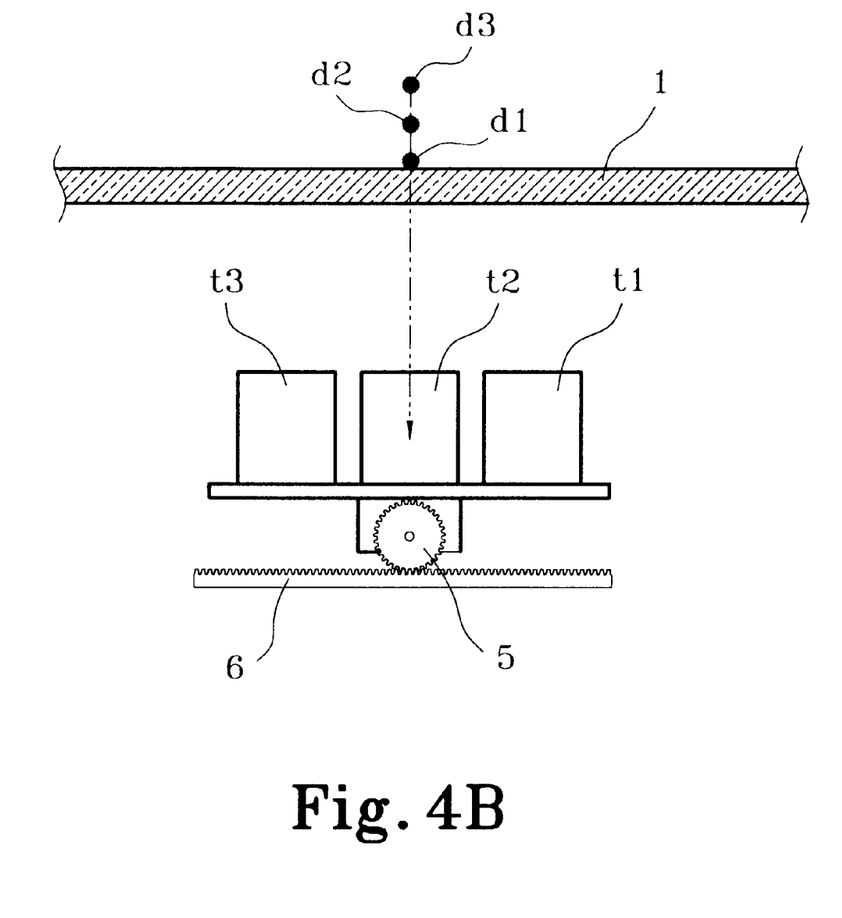
FIG. 4B is a schematic view showing the switching operation of FIG. 4A.

With reference to FIGS. 4A and 4B, the schematic views of the second embodiment and the switching action of the present invention are illustrated. As shown in the figures, lenses t1, t2, and t3 of different thickness are arranged on a driven means 5 formed by gears. The driven means 5 is further engaged with a driving means 6 formed by a rack or spiral rod. As the driving means 6 is driven, the driven means 5 will drive the lenses t1, t2 and t3 to be switched.

Figure 5:
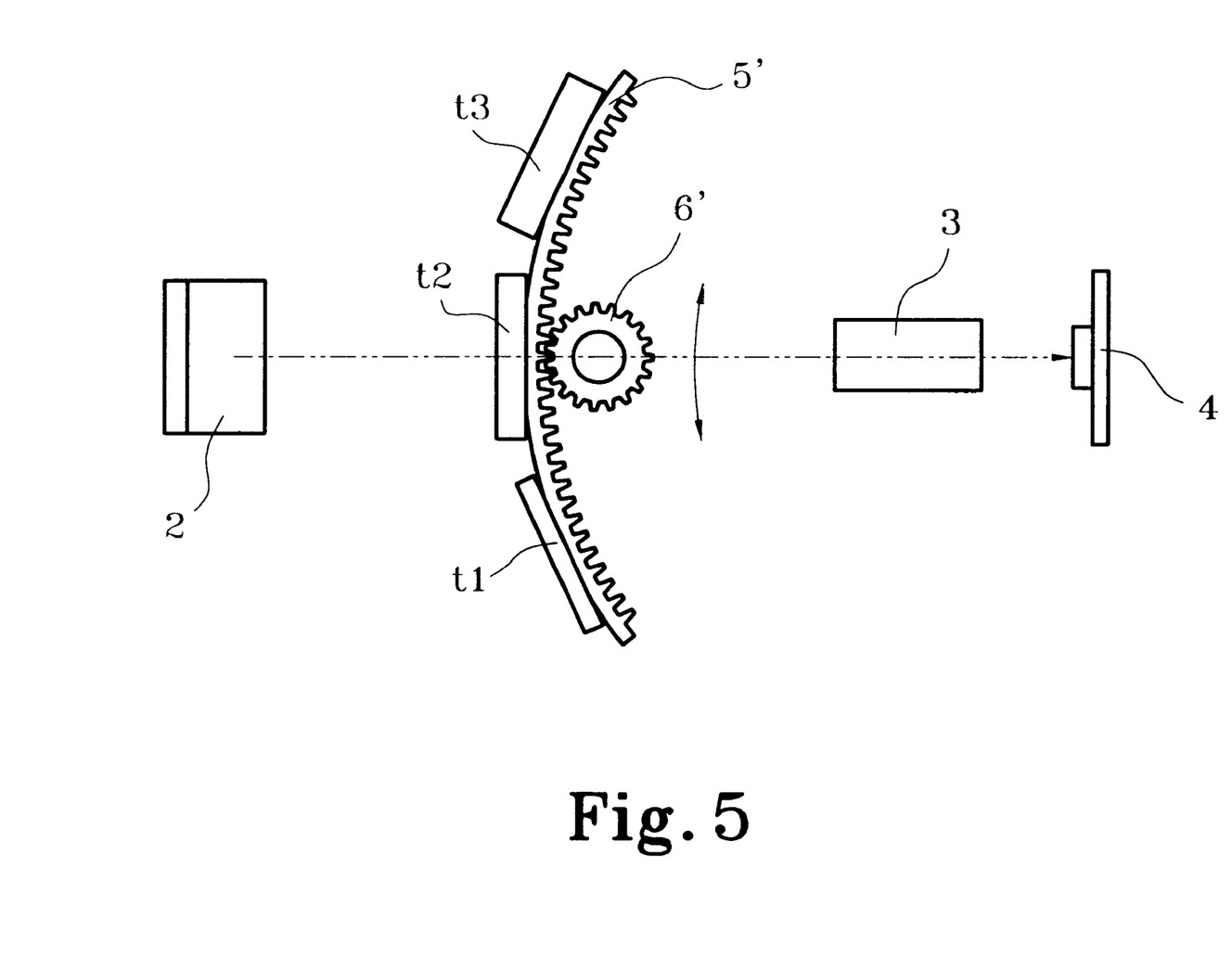
FIG. 5 is a schematic view of the third embodiment in the present invention.

Referring to FIG. 5, the schematic view of the third embodiment and the switching action of the present invention are illustrated. As shown in the figures, the lenses t1, t2 and t3 are arranged on cambered rotary means 7. The driven means 5' of the cambered rotary means 7 is formed by a cambered rack. The driving means 6' is formed by a gear or spiral rod. In switching, the lenses t1, t2 and t3 are switched in a cambered way.

Figure 6:
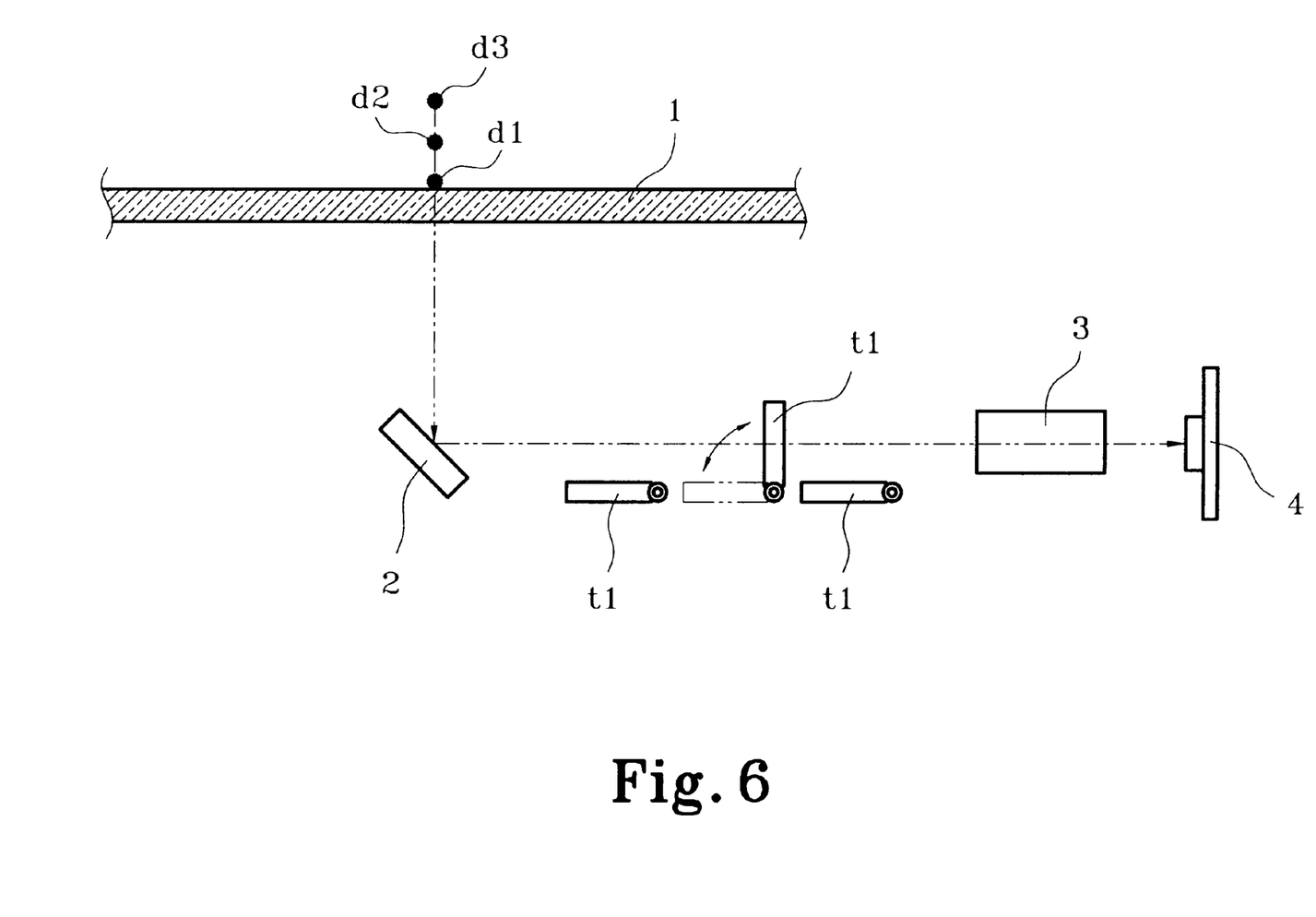
FIG. 6 is a schematic view of the fourth embodiment in the present invention.

With reference to FIG. 6, the schematic view of the fourth embodiment and the switching action of the present invention are illustrated. As shown in the figures, three lenses t1, t1 and t1 with the same or different thickness can be arranged in a straight line. The first lens t1 is fixed, and the second lens t1 and third lens t1 are transversal arranged or displaced, or is displaced upwards or downwards to be before or behind the first lens t1. In switching, the focus position of the first scanning optical path (L1) is formed by the first lens t1, while second scanning optical path (L2=L1+L1) is formed by that of the first lens t1 added with that (L1) of the second lens t1. While the third scanning optical path (L3) is formed by that (L1) the first lens t1 added with that (L1) of the second lens t1, and further added with that (L1) of the third lens t1 (L3=L1+L1+L1). Therefore, a scanning of multiple (dual) focus positions can be performed for matching with the positions of different original documents for acquiring a clear image.

Figure 7:
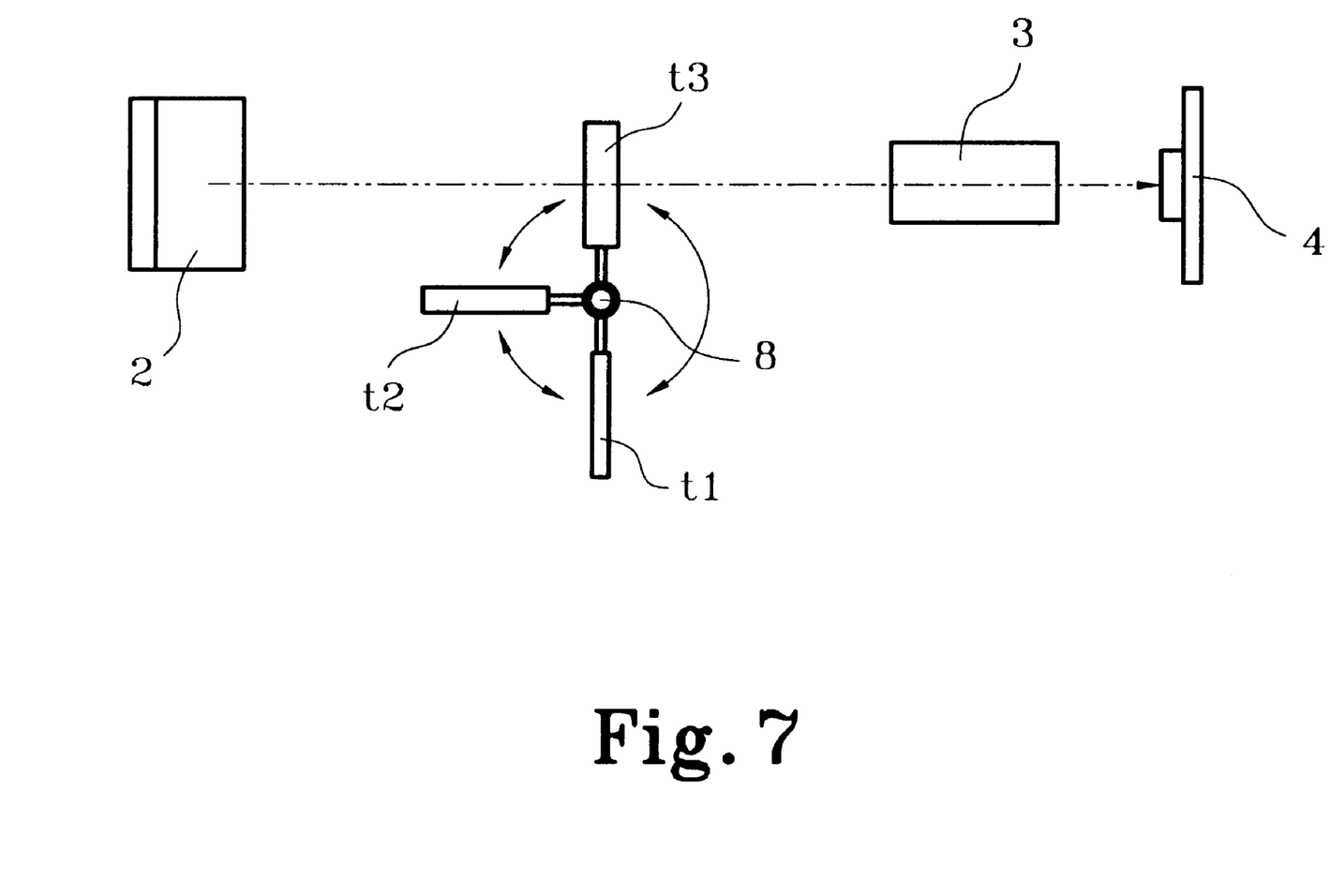
FIG. 7 is a schematic view of the fifth embodiment in the present invention.

Referring to FIG. 7, a schematic view of the fifth embodiment of the present invention is illustrated. As shown in the figure, the lenses t1, t2 and t3 of different thickness can be arranged on a switching device 8 which is rotatable in the circumference of a round. As the switching device 8 rotates in the circumference of a round, the switching of lenses t1, t2 and t3 with different thickness are performed for achieve the object of switching in different scanning optical path or dual (multiple) optical paths scanning.

Figure 8:
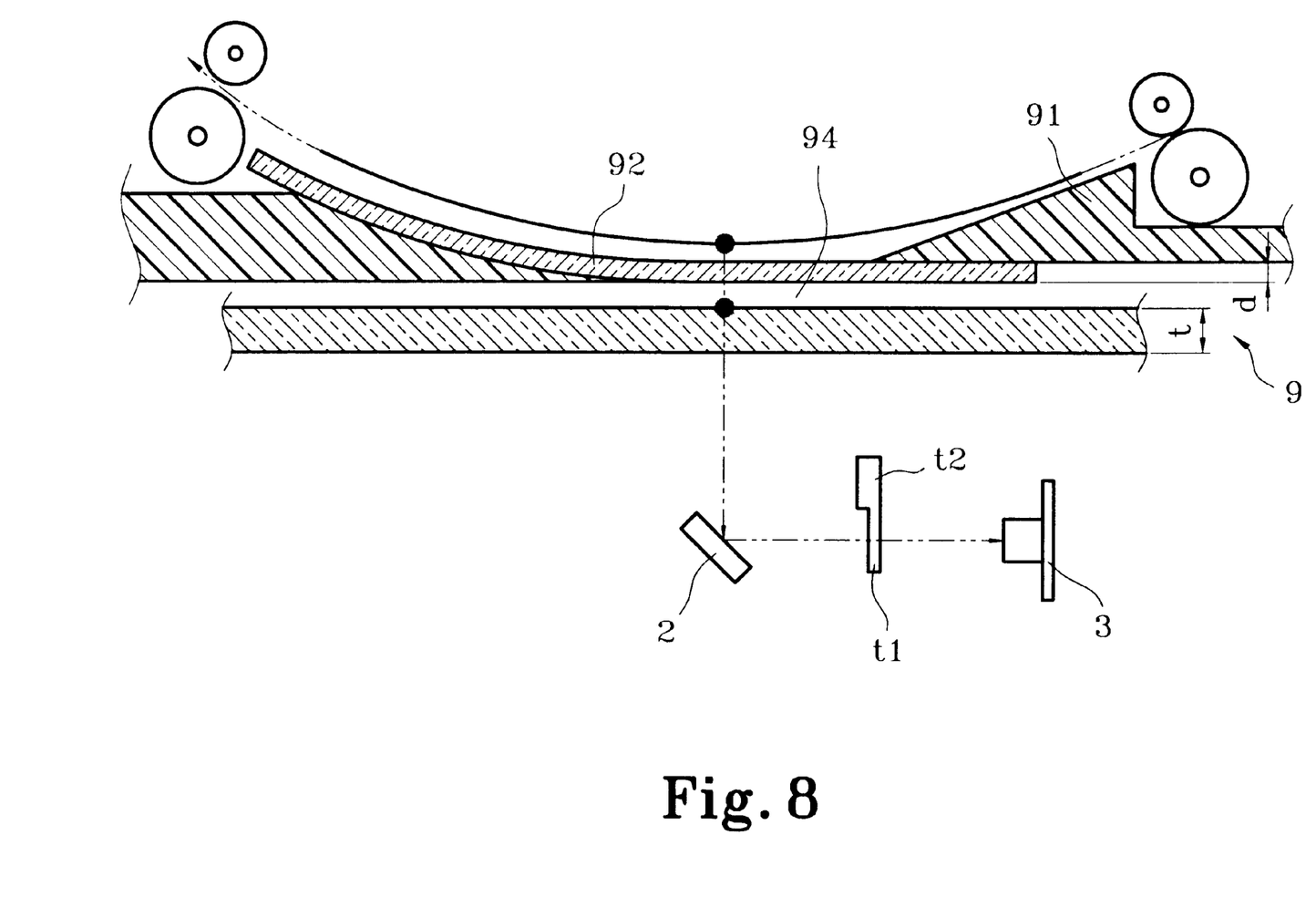
FIG. 8 is a schematic view of the sixth embodiment in the present invention.

With reference to FIG. 8, the schematic view of the sixth embodiment according to the present invention is illustrated. As shown in the figures, in the switching device for multiple (dual) focus points of multiple (dual) optical paths in the present invention. Other than the aforesaid embodiments, it can be used in an auto paper feeder 9. A guide piece (guide paper piece or a transparent thin piece) 92 is arranged in the housing 91 of the auto paper feeder. The guide piece 92 is suitable to guide the original document for the auto paper feeder 9. While the guide piece 92 has a predetermined width which cause the original document to be placed above the surface of the glass with a distance. Maybe an error 94 from the mechanical assembly cause the original document to be higher than the practical focusing surface (such as the surface of glass on the platform) instead of a problem of Newton ring to cause a bad effect in scanning. At least two lenses t1 and t2 of different (or the same) thickness can be arranged between the reflector 2 and the primary lens 3 for being used in the switching multiple (dual) optical path scanning so as to solve the problem of the mismatch between the focus surface and the surface of the original document in scanning.

The lenses t1, t2 and t3 of different thickness are arranged between the reflector 2 and primary lens 3 so that the user may perform the switching operation for multiple (dual) scanning optical paths. Moreover, in the whole optic system, as any optical path is switched, the materials of glass are identical (only the total thickness is different), thus the transmittances thereof are similar. In necessary, identical plating processes can be performed for acquiring an approximately equal illumination so as to have a preferred effect.

Furthermore, in some conditions, two or multiple lenses of different thickness can be plated with film, for example, IR-cut plating process, for reducing reflecting (anti-reflecting) film, so as to increase the filtering effect of light of some color. Thus, a special scanning effect is achieved.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A switching device for multiple focus points of multiple optical paths in a scanning optical path device, the scanning optical path means comprising: a glass arranged for supporting a document, a reflector below the glass, a primary lens, a sensing element behind the primary lens; after the document is radiated by light, an image of the scanning article being reflected by the reflector, then being projected to said primary lens, and then being received by the sensing element so as to read the image of the document; wherein:

at least two lenses of different thickness are arranged between the reflector and primary lens, the switching device includes a driven means and a driving means engaged with the driven means; in switching, various scanning optical paths or multiple optical paths switching operation are performable so that the focus points are higher than a surface of the glass, and thus, the original document has a proper gap with the surface of the glass on a platform for avoiding a Newton ring effect so as to acquire a clear scanning image.

2. The switching device for multiple focus points of multiple optical paths as claimed in claim 1, wherein the driven means of the switching device is a gear and the driving means is a spiral rod or a rack for being switched horizontally.

3. The switching device for multiple focus points of multiple optical paths as claimed in claim 1, wherein the driven means of the switching device is a cambered rack and the driving means is a spiral rod or a gear for being switched in a cambered rotation path.

4. The switching device for multiple focus points of multiple optical paths as claimed in claim 1, wherein the switching device is rotated in a circumference of a circle to drive the plurality of lenses to switch along the circumference.

5. The switching device for multiple focus points of multiple optical paths as claimed in claim 1, wherein lenses and the switching device are applied to a scanning device with an auto-paper feeder for solving the problem that in scanning, the original document floats above the surface of the glass due to the thickness of a guide piece, or the problem that the original document is higher than the practical focus plane due to an error from mechanical assembly.

6. A switching device for multiple focus points of multiple optical paths in a scanning optical path device, the scanning optical path means comprising: a glass arranged for supporting a document, a reflector below the glass, a primary lens, a sensing element behind the primary lens; after the document is radiated by light, an image of the scanning article being reflected by the reflector, then being projected to said primary lens, and then being received by the sensing element so as to read the image of the document; wherein:

at least a first, a second and a third lenses, respectively, of the same thickness or different thickness are arranged between the reflector and primary lens, these lenses are arranged in a straight line, or are transversally arranged or displaced, or is displaced upwards or downwards so that the focus points are higher than the surface of the glass, and thus, the original document has a proper gap with the surface of the glass on a platform for avoiding a Newton ring effect so as to acquire a clear scanning image, said switching device for providing switching of various scanning optical paths.

7. The switching device for multiple focus points of multiple optical paths as claimed in claim 6, wherein a first scanning optical path is formed by the first lens.

8. The switching device for multiple focus points of multiple optical paths as claimed in claim 6, wherein a second scanning optical path is formed by the first and second lenses.

9. The switching device for multiple focus points of multiple optical paths as claimed in claim 6, wherein a third scanning optical path includes the first, second, and third lenses.

* * * * *